US012738731B2

(12) United States Patent
Yamamoto et al.

(10) Patent No.: US 12,738,731 B2
(45) Date of Patent: Sep. 15, 2026

(54) DC POWER DISTRIBUTION SYSTEM AND VOLTAGE STABILIZER

(71) Applicant: TOSHIBA MITSUBISHI-ELECTRIC INDUSTRIAL SYSTEMS CORPORATION, Tokyo (JP)

(72) Inventors: Yushin Yamamoto, Chuo-ku (JP); Satoshi Ogasawara, Sapporo (JP); Koji Orikawa, Sapporo (JP); Sosuke Suzuki, Sapporo (JP)

(73) Assignee: TMEIC CORPORATION, Tokyo (JP)

( * ) Notice: Subject to any disclaimer, the term of this patent is extended or adjusted under 35 U.S.C. 154(b) by 180 days.

(21) Appl. No.: 18/694,714

(22) PCT Filed: Aug. 26, 2022

(86) PCT No.: PCT/JP2022/032153

§ 371 (c)(1),
(2) Date: Mar. 22, 2024

(87) PCT Pub. No.: WO2024/042696

PCT Pub. Date: Feb. 29, 2024

(65) Prior Publication Data

US 2025/0007404 A1 Jan. 2, 2025

(51) Int. Cl.

*H02J 1/00* (2026.01)
*H02J 1/04* (2006.01)
*H02J 4/25* (2026.01)

(52) U.S. Cl.

CPC .................. *H02J 1/00* (2013.01); *H02J 1/04* (2013.01); *H02J 4/25* (2026.01)

(58) Field of Classification Search

CPC ...................................... H02J 1/00; H02J 5/00
See application file for complete search history.

(56) References Cited

U.S. PATENT DOCUMENTS 6,433,522 B1 * 8/2002 Siri ......................... H02J 1/102
323/272
6,487,096 B1 * 11/2002 Gilbreth .................... H02J 1/14
363/35

(Continued)

FOREIGN PATENT DOCUMENTS

JP 2007-60796 A 3/2007
JP 2019-205225 A 11/2019

OTHER PUBLICATIONS

International Search Report issued Oct. 18, 2022 in PCT/JP2022/032153, 2 pages.

(Continued)

*Primary Examiner* — Gary L Laxton
(74) *Attorney, Agent, or Firm* — Oblon, McClelland, Maier & Neustadt, L.L.P.

(57) ABSTRACT

A DC power distribution system includes a DC bus that distributes DC power, a first power converter, and a voltage stabilizer. The first power converter is connected between the DC bus and a load, and converts DC power from the DC bus into electric power required by the load. The voltage stabilizer is connected to the DC bus in parallel with the first power converter. The voltage stabilizer supplies electric power to the DC bus, the electric power corresponding to fluctuation of an input voltage input from the DC bus to the first power converter and corresponding to DC power supplied from the DC bus to the first power converter.

17 Claims, 11 Drawing Sheets

(56) References Cited

U.S. PATENT DOCUMENTS

| | | | | |
|---|---|---|---|---|
| 11,482,944 | B2 * | 10/2022 | Dai | H02M 7/06 |
| 2011/0206272 | A1 * | 8/2011 | Takaichi | H02J 9/061<br>382/145 |
| 2022/0231597 | A1 * | 7/2022 | Zhang | H02M 1/32 |

OTHER PUBLICATIONS

Honma et al., "A Control Method for Stabilizing DC-Link Voltage Resonance of an Inverter Connected with a Bidirectional Chopper", The Institute of Electrical Engineers of Japan, Aug. 28, 2015, 7 Pages (with Bibliographic information).
Korean Office Action issued Jul. 3, 2025 In Korean Patent Application No. 10-2024-7009116 with English Machine translation, 9 pgs.
Zhang et al.; "Power Buffer With Model Predictive Control for Stability of Vehicular Power Systems With Constant Power Loads", IEEE Transactions on Power Electronics, vol. 28; No. 12, pp. 5804-5812, Dec 2013. (9 pages).
Iyer et al.; "An Active Voltage Stabilizer for a DC Microgrid System"; Publication date: IEEEAccess, vol. 9, pp. 86786-86800 Jun. 16, 2021. (15 pages).
Office Action dated Apr. 28, 2026, Issued in counterpart IN Application No. 202417021886, citing documents 1 and 2, with English Translation. (6 pages).

* cited by examiner

FIG.7

| Parameter | Symbol | Value |
|---|---|---|
| Filter inductance | $L_f$ | 642 μH |
| Filter capacitance | $C_f$ | 103 μF |
| Load inductance | $L_L$ | 427 μH |
| Load resistance | $R_L$ | 4.7 Ω |
| DC bus voltage | $E$ | 50 V |
| Switching frequency | $f_{sw}$ | 20 kHz |
| Control period | $T_c$ | 25 μs |
| Load propotional gain | $k_{pL}$ | 1.739 |
| Load integral gain | $k_{iL}$ | $1.69 \times 10^4$ |
| Buffer capacitance | $C_b$ | 10 μF |
| Smoothing reactor | $L_C$ | 735 μH |
| Buffer reference voltage | $V_{b*}$ | 100 V |
| Comp. circuit propotional gain | $k_{pc}$ | 11.1 |
| Comp. circuit integral gain | $k_{ic}$ | $2.90 \times 10^4$ |
| LPF cutoff frequency | $f_{LC}$ | 10 Hz |
| Buffer voltage propotional gain | $k_{pv}$ | $1.51 \times 10^{-3}$ |
| Buffer voltage integral gain | $k_{iv}$ | $7.90 \times 10^{-2}$ |

(A)
DC input voltage [V]
60
50
40
30
20
10
0
$v_L$
0
10
20
30
40
Time [ms]
(B)
DC input current [A]
2.5
2
1.5
1
0.5
0
−0.5
$i_L$
0
10
20
30
40
Time [ms]
(C)
Load current [A]
4
3.5
3
2.5
2
1.5
1
$i_R$
0
10
20
30
40
Time [ms]

(A) DC input voltage [V]

60 50 40 30 20 10 0

$v_L$ 0 10 20 30 40

Time [ms]

(B) DC input current [A]

2.5 2 1.5 1 0.5 0 −0.5

$i_L$ 0 10 20 30 40

Time [ms]

(C) Load current [A]

4 3.5 3 2.5 2 1.5 1

$i_R$ 0 10 20 30 40

Time [ms]

DC POWER DISTRIBUTION SYSTEM AND VOLTAGE STABILIZER

TECHNICAL FIELD

The present disclosure relates to a DC power distribution system and a voltage stabilizer.

BACKGROUND ART

In recent years, attention has been paid to a DC power distribution system in which a plurality of power supplies and a plurality of electric loads are connected to a DC bus and DC power is exchanged via the DC bus. As compared with an AC distribution system that distributes AC power, the DC power distribution system has no synchronization problem and is easy in voltage control. Therefore, the DC power distribution system has an advantage that it is easy to connect a renewable energy power supply whose power generation output fluctuates depending on weather conditions. In addition, since DC/AC power conversion between the power supply and the electric load becomes unnecessary, a power loss can be reduced, so that power distribution efficiency can be expected to be improved.

On the other hand, the DC power distribution system has a problem of instability due to a constant power load. This is because, when a power converter arranged closest to a load strictly controls electric power supplied to the load, the power converter behaves as a constant power load and has a negative impedance characteristic. The presence of the negative impedance may cause oscillation by interaction with a filter provided on the DC bus.

In recent years, many countermeasures have been proposed for the instability due to the constant power load. As one of them, NPL 1 proposes a control method in which, in order to suppress instability of DC voltage control due to a constant power load, control of a power converter on a load side is changed to cause the constant power load to behave like a constant current load when viewed from a DC bus.

CITATION LIST

Non Patent Literature

NPL 1: Hiroki Homma, Satoshi Ogasawara, and Masatsugu Takemoto, "A Control Method for Stabilizing DC-Link Voltage Resonance of an Inverter Connected with a Bidirectional Chopper", The Institute of Electrical Engineers of Japan, Industry Application Society, Joint Technical Meeting on Semiconductor Power Converter/Motor Drive, SPC 15145, MD 15116 (2015)

SUMMARY OF INVENTION

Technical Problem

According to NPL 1, although steady electric power supply to a load can be performed satisfactorily, there is a problem that electric power required by a load cannot be completely supplied transiently.

The present disclosure has been made to solve such a problem, and an object of the present disclosure is to suppress instability of DC voltage control due to a constant power load without deterioration of a control characteristic of the constant power load in a DC power distribution system.

Solution to Problem

According to one aspect of the present disclosure, a DC power distribution system includes a DC bus that distributes DC power, a first power converter, and a voltage stabilizer. The first power converter converts DC power from the DC bus into electric power required by a load, the first power converter being connected between the DC bus and the load. The voltage stabilizer is connected to the DC bus in parallel with the first power converter. The voltage stabilizer supplies electric power to the DC bus, the electric power corresponding to fluctuation of an input voltage input from the DC bus to the first power converter and corresponding to DC power supplied from the DC bus to the first power converter.

According to another aspect of the present disclosure, in a voltage stabilizer of a DC power distribution system, the DC power distribution system includes: a DC bus; and a first power converter that converts DC power from the DC bus into electric power required by a load, the first power converter being connected between the DC bus and the load. The voltage stabilizer supplies electric power to the DC bus, the electric power corresponding to fluctuation of an input voltage input from the DC bus to the first power converter and corresponding to DC power supplied from the DC bus to the first power converter.

Advantageous Effects of Invention

According to the present disclosure, in the DC power distribution system, instability of DC voltage control due to a constant power load can be suppressed without deterioration of a control characteristic of the constant power load.

BRIEF DESCRIPTION OF DRAWINGS

FIG. 7 is a view illustrating parameters of individual components of the experimental system illustrated in FIG. 6.

DESCRIPTION OF EMBODIMENTS

Figure 1:
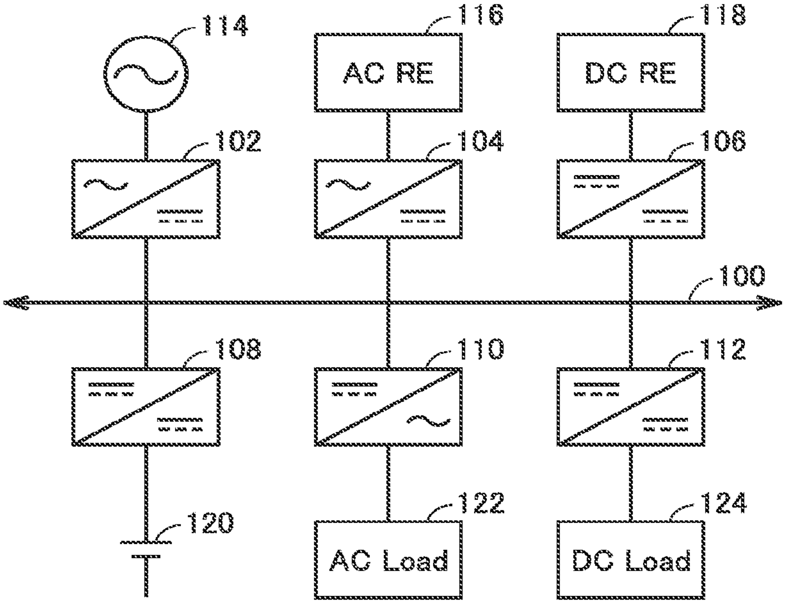
FIG. 1 is a block diagram illustrating a configuration example of a DC power distribution system to which a voltage stabilizer according to the present embodiment can be applied.

Hereinafter, an embodiment of the present disclosure will be described in detail with reference to the drawings. Note that, in the following description, the same or corresponding parts in the drawings are denoted by the same reference numerals, and a description thereof will not be repeated in principle.

(DC Power Distribution System)

FIG. 1 is a block diagram illustrating a configuration example of a DC power distribution system to which a voltage stabilizer according to the present embodiment can be applied.

As illustrated in FIG. 1, in the DC power distribution system, a plurality of power converters 102, 104, 106, and 108 are connected to a DC bus 100. Power converters 102, 104, 106, and 108 are line regulation converters (LRCs) configured to keep an output voltage constant regardless of a change in an input voltage.

Power converter 102 converts AC power supplied from a commercial system 114 into DC power, and outputs the DC power to DC bus 100. Power converter 104 converts AC power generated by an AC power supply 116 into DC power, and outputs the DC power to DC bus 100. AC power supply 116 may include power generation facilities that do not depend on weather conditions, such as a steam turbine generator and a gas turbine generator, and power generation facilities whose power generation output fluctuates depending on weather conditions, such as a wind power generation facility.

Power converter 106 converts DC power generated by a DC power supply 118 into DC power having a constant voltage, and outputs the DC power to DC bus 100. DC power supply 118 may include a power generation facility such as a solar power generation facility and a fuel cell. Power converter 108 converts DC power stored in a power storage device 120 into DC power having a constant voltage, and outputs the DC power to DC bus 100. Power storage device 120 is, for example, a storage battery.

A plurality of power converters 110 and 112 are further connected to DC bus 100. Power converters 110 and 112 are point of load (POL) converters arranged in the immediate vicinity of a load. Power converter 110 converts DC power supplied from DC bus 100 into AC power, and supplies the AC power to an AC load 122. Power converter 112 boosts or steps down the DC power supplied from DC bus 100, and supplies the DC power to a DC load 124.

Each of AC power supply 116, DC power supply 118, and loads 122 and 124 exchanges electric power with DC bus 100 irrelevantly to a voltage of DC bus 100. As a result, an electric power demand-supply balance of the DC power distribution system may become excessive demand or excessive supply, to cause fluctuation of the DC voltage of DC bus 100. However, in a case of the excessive demand, the DC voltage of DC bus 100 can be kept constant by commercial system 114 or power storage device 120 compensating for the shortage of supplied electric power. Further, in a case of the excessive supply, the excess of supplied electric power is stored in power storage device 120, whereby the DC voltage of DC bus 100 can be kept constant.

The DC power distribution system illustrated in FIG. 1 constitutes a DC microgrid. The microgrid is a system that can be operated independently of a trunk system, by collectively controlling a power storage device and a small-scale power supply such as a solar power generation facility or a fuel cell. In the DC microgrid, DC power distribution is adopted for the microgrid. As compared with an AC distribution system, the DC power distribution system has no synchronization problem and is easy in voltage control. Therefore, the DC power distribution system has an advantage that it is easy to connect a renewable energy power supply whose power generation output fluctuates depending on weather conditions. Further, in principle, power supplies such as a solar power generation facility, a fuel cell, and a storage battery output DC power, and a load is often operated by the DC power supply. Therefore, according to the DC power distribution system, since DC/AC power conversion between the power supply and the load becomes unnecessary, a power loss can be reduced, and power distribution efficiency can be expected to be improved.

On the other hand, the DC power distribution system has a problem of instability due to a constant power load. This is because, when the POL converter strictly controls electric power supplied to the load, the POL converter behaves as a constant power load (CPL) and has a negative impedance characteristic. The presence of the negative impedance may cause oscillation by interaction with a filter provided on DC bus 100.

(Instability due to constant power load)

Next, instability due to the constant power load (CPL) in the DC power distribution system illustrated in FIG. 1 will be described.

Figure 2:
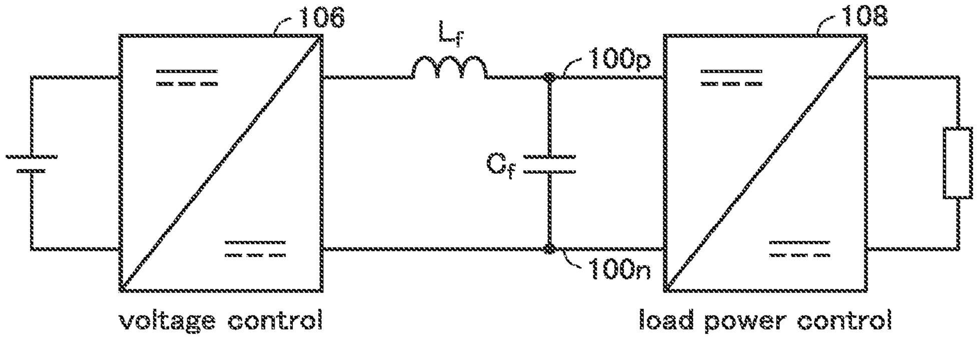
FIG. 2 is a diagram illustrating an analysis model obtained by simplifying the DC power distribution system illustrated in FIG. 1.

FIG. 2 illustrates an analytical model obtained by simplifying the DC power distribution system illustrated in FIG. 1. In FIG. 2, power converter 106 illustrated on a left side is LRC, and controls the DC voltage of DC bus 100. Power converter 108 illustrated on a right side is a POL converter, and supplies required electric power to the load. Power converter 108 corresponds to an implementation example of a "first power converter". Power converter 106 corresponds to an implementation example of a "second power converter".

In general, to an output of power converter 106 that performs voltage control or an input of power converter 108 that supplies electric power to the load, an LC filter is inserted so that a switching ripple generated in each power converter does not affect operations of other electric devices. A reactor Lf and a capacitor $C_f$ in the figure constitute the LC filter.

Figure 3:
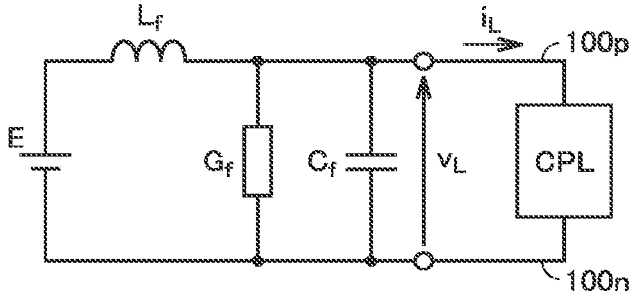
FIG. 3 is an equivalent circuit of the analysis model illustrated in FIG. 2.

FIG. 3 is an equivalent circuit of the analysis model illustrated in FIG. 2. In the equivalent circuit illustrated in FIG. 3, power converter 106 that performs voltage control is represented by a DC voltage source E, and power converter 108 that supplies electric power to the load is represented by a constant power load (CPL). The CPL is connected to DC voltage source E including the LC filter.

When the CPL is not connected to DC bus 100, a transfer function to an input voltage $v_L$ for DC voltage source E can be expressed by the following Equation (1).

[Formula 1]

$$G(s) = \frac{\frac{1}{L_f C_f}}{s^2 + \frac{G_f}{C_f}s + \frac{1}{L_f C_f}} = \frac{\omega_n^2}{s^2 + 2\zeta\omega_n s + \omega_n^2} \quad (1)$$

Here, $\omega_n$ is a resonance angular frequency of the LC filter, and $\zeta$ is an attenuation coefficient, which are expressed by the following Equation (2). That is, a conductance $G_f$ connected in parallel with a filter capacitor $C_f$ can be considered to represent control stability of power converter 106 that performs the voltage control illustrated in FIG. 2.

[Formula 2]

$$\omega_n = \frac{1}{\sqrt{L_f C_f}},\ \zeta = \frac{1}{2} G_f \sqrt{\frac{L_f}{C_f}} \tag{2}$$

Whereas, the CPL supplies electric power $p_L$ to the load regardless of fluctuation of input voltage $v_L$. Since electric power $p_L$ actually supplied from DC bus 100 to the CPL is a product ($p_L = v_L \cdot i_L$) of an input current $i_L$ and input voltage $v_L$, the following Equation (3) is obtained.

[Formula 3]

$$\frac{\partial p_L}{\partial v_L} = i_L + v_L \frac{\partial i_L}{\partial v_L} = 0 \tag{3}$$

Here, $\partial i_L/\partial v_L$ represents an AC conductance $G_L$ of the CPL. AC conductance $G_L$ can be obtained from Equation (3).

[Formula 4]

$$G_L = \frac{\partial i_L}{\partial v_L} = -\frac{i_L}{v_L} = -\frac{p_L}{v_L^2} \tag{4}$$

As shown in Equation (4), the CPL is a negative conductance in terms of AC. It can be seen that negative conductance $G_L$ increases as electric power $p_L$ increases. Since this negative conductance $G_L$ is connected in parallel with conductance $G_f$, attenuation coefficient $\zeta$ becomes negative when $G_f + G_L$ becomes negative. As a result, it can be seen that the voltage control in power converter 106 has oscillation at a resonance frequency of the LC filter and becomes unstable.

In order to prevent such destabilization of the voltage control by the CPL, it is obvious that input current $i_L$ is simply required to remain unchanged even when input voltage $v_L$ changes, that is, the load is simply required to have constant current.

[Formula 5]

$$G_L = \frac{\partial i_L}{\partial v_L} = 0 \tag{5}$$

That is, as shown in Equation (5), if AC conductance $G_L$ of the CPL can be set to 0, stability of the voltage control in power converter 106 does not change regardless of a load state. This makes it possible to design the voltage control system irrelevantly to the load. Here, when electric power $p_L = v_L \cdot i_L$ is partially differentiated by $v_L$ and Equation (5) is substituted, the following Equation (6) is obtained.

[Formula 6]

$$\frac{\partial p_L}{\partial v_L} = i_L + v_L \frac{\partial i_L}{\partial v_L} = i_L \tag{6}$$

According to Equation (6), it can be seen that electric power $p_L$ is simply required to be varied in accordance with fluctuation of input voltage $v_L$ in order to cause the load to have a constant current. In NPL 1, this control method is applied to a motor drive system connected to a bidirectional chopper. In the control method, electric power $p_L$ is varied in accordance with fluctuation of input voltage $v_L$ to a motor driving inverter, so that input current $i_L$ to the inverter is set to a constant current that does not fluctuate with respect to input voltage $v_L$. By causing the inverter to behave like a constant current load when viewed from the bidirectional chopper, the voltage control of the bidirectional chopper is prevented from becoming unstable.

(Voltage Stabilizer)

<Operating Principle>

In the above-described control method of varying electric power $p_L$ in accordance with fluctuation of input voltage $v_L$, there is a concern over deterioration of a control characteristic of the load depending on a characteristic of the load. Specifically, in a steady state in which input voltage $v_L$ is stable, electric power $p_L$ is equal to electric power $p_L^*$ required by the load, so that there is no problem in the control characteristic of the load. Whereas, in a transient state in which input voltage $v_L$ fluctuates, electric power $p_L$ may be different from electric power $p_L^*$. Therefore, applying the above control method to the load whose transient characteristic is particularly important may deteriorate the control characteristic of the load.

In order not to deteriorate the control characteristic of the load, a power converter on the load side needs to operate as a CPL and supply electric power $p_L^*$ to the load regardless of the steady state and the transient state.

Figure 4:
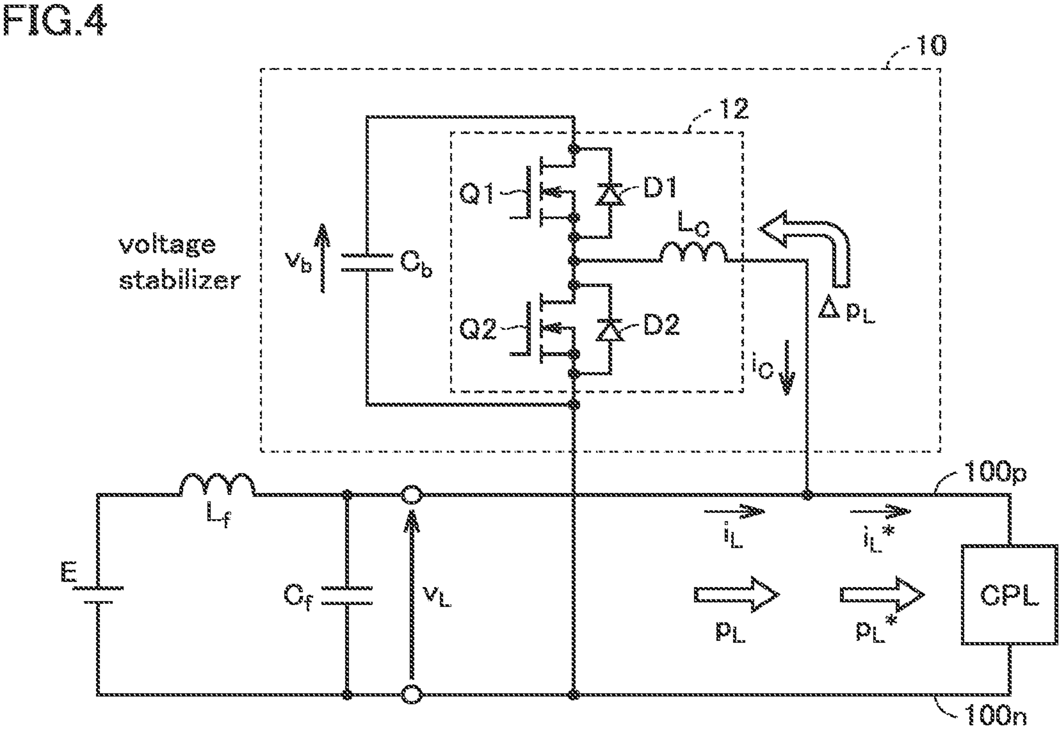
FIG. 4 is a diagram illustrating a main circuit configuration of the voltage stabilizer.

Therefore, in the DC power distribution system according to the present embodiment, as illustrated in FIG. 4, a voltage stabilizer 10 is connected to DC bus 100 in parallel with the power converter (CPL) on the load side. As described below, voltage stabilizer 10 is configured to supply, to DC bus 100, electric power $\Delta p_L$ corresponding to fluctuation of input voltage $v_L$ and corresponding to electric power $p_L^*$ supplied from DC bus 100 to the power converter on the load side. Specifically, voltage stabilizer 10 is configured to vary electric power $p_L$ supplied from DC bus 100 to the power converter on the load side and voltage stabilizer 10 in accordance with fluctuation of input voltage $v_L$, and exchange, with DC bus 100, electric power $\Delta p_L$ corresponding to a deviation between electric power $p_L$ and electric power $p_L^*$. That is, the power converter on the load side and voltage stabilizer 10 are operated as a constant current load as a whole.

FIG. 4 is a diagram illustrating a main circuit configuration of voltage stabilizer 10. FIG. 4 is obtained by adding voltage stabilizer 10 in parallel with the CPL in the equivalent circuit of the DC power distribution system illustrated in FIG. 3. As illustrated in FIG. 4, voltage stabilizer 10 includes a buffer capacitor Cb and a bidirectional DC/DC converter 12.

Buffer capacitor $C_b$ functions as an energy storage element for exchanging transient electric power between voltage stabilizer 10 and DC bus 100. Note that, since voltage stabilizer 10 does not handle steady electric power, a small-capacity capacitor is applicable as buffer capacitor $C_b$. In addition, since responsiveness is also important, an inter-terminal voltage $V_b$ of buffer capacitor $C_b$ is set higher than input voltage $v_L$ of the CPL.

Bidirectional DC/DC converter 12 is configured to be able to exchange electric power between DC bus 100 and buffer capacitor $C_b$. By controlling a current (hereinafter, also referred to as compensating current $i_C$) flowing from bidirectional DC/DC converter 12 to DC bus 100, the exchange of electric power $\Delta p_L$ is realized between DC bus 100 and buffer capacitor $C_b$.

Specifically, in a case where electric power is supplied from DC bus 100 to buffer capacitor $C_b$, bidirectional DC/DC converter 12 boosts input voltage $v_L$ to a desired DC voltage, and supplies input voltage $v_L$ to buffer capacitor $C_b$. Further, when electric power is supplied from buffer capacitor $C_b$ to DC bus 100, inter-terminal voltage $v_b$ of buffer capacitor $C_b$ is stepped down to a desired DC voltage and supplied to DC bus 100.

In the example of FIG. 4, bidirectional DC/DC converter 12 is a bidirectional chopper circuit, and is configured including switching elements Q1 and Q2, diodes D1 and D2, and a reactor $L_C$. Switching elements Q1 and Q2 are connected in series between a positive electrode and a negative electrode of buffer capacitor $C_b$. Switching elements Q1 and Q2 are self-arc-extinguishing semiconductor switching elements such as metal oxide semiconductor field effect transistors (MOSFETs) or insulated gate bipolar transistors (IGBTs). Diodes D1 and D2 are freewheeling diodes (FWDs), and are connected in anti-parallel with switching elements Q1 and Q2, respectively.

Reactor $L_C$ is connected between a node between switching elements Q1 and Q2 and a DC positive bus 100*p* of DC bus 100. The negative electrode of buffer capacitor $C_b$ is connected to a DC negative bus 100*n* of DC bus 100.

When electric power is supplied from DC bus 100 to buffer capacitor $C_b$, switching element Q2 is turned ON/OFF at a predetermined cycle, and switching element Q1 is turned OFF. When switching element Q2 is turned ON, a current flows through a path of DC positive bus 100*p*, reactor $L_C$, switching element Q2, and DC negative bus 100*n*, and electromagnetic energy is stored in reactor $L_C$.

When switching element Q2 is turned OFF, a current flows from DC positive bus 100*p* to buffer capacitor $C_b$ via reactor $L_C$ and diode D1, and buffer capacitor $C_b$ is charged. Inter-terminal voltage $V_b$ of buffer capacitor $C_b$ is higher than input voltage $v_L$ by an amount of a voltage generated in reactor $L_C$. By adjusting a ratio (duty ratio) between ON time and OFF time of switching element Q2 in each cycle, inter-terminal voltage $V_b$ can be adjusted.

When electric power is supplied from buffer capacitor $C_b$ to DC bus 100, switching element Q1 is turned ON/OFF at a predetermined cycle, and switching element Q2 is turned OFF. When switching element Q1 is turned ON, a current flows from buffer capacitor $C_b$ to DC positive bus 100*p* via switching element Q1 and reactor $L_C$, and electromagnetic energy is stored in reactor $L_C$.

When switching element Q1 is turned OFF, a current flows through a path of reactor $L_C$, DC positive bus 100*p*, DC negative bus 100*n*, and diode D2, and electric power is supplied to DC bus 100. Input voltage $v_L$ is lower than inter-terminal voltage $V_b$ of buffer capacitor $C_b$. By adjusting a ratio (duty ratio) between ON time and OFF time of switching element Q1 in each cycle, input voltage $v_L$ can be adjusted.

Note that bidirectional DC/DC converter 12 is not limited to the bidirectional chopper circuit, and an insulating DC/DC converter or the like can also be applied.

<Control Configuration>

Next, a control configuration of voltage stabilizer 10 illustrated in FIG. 4 will be described.

Figure 5:
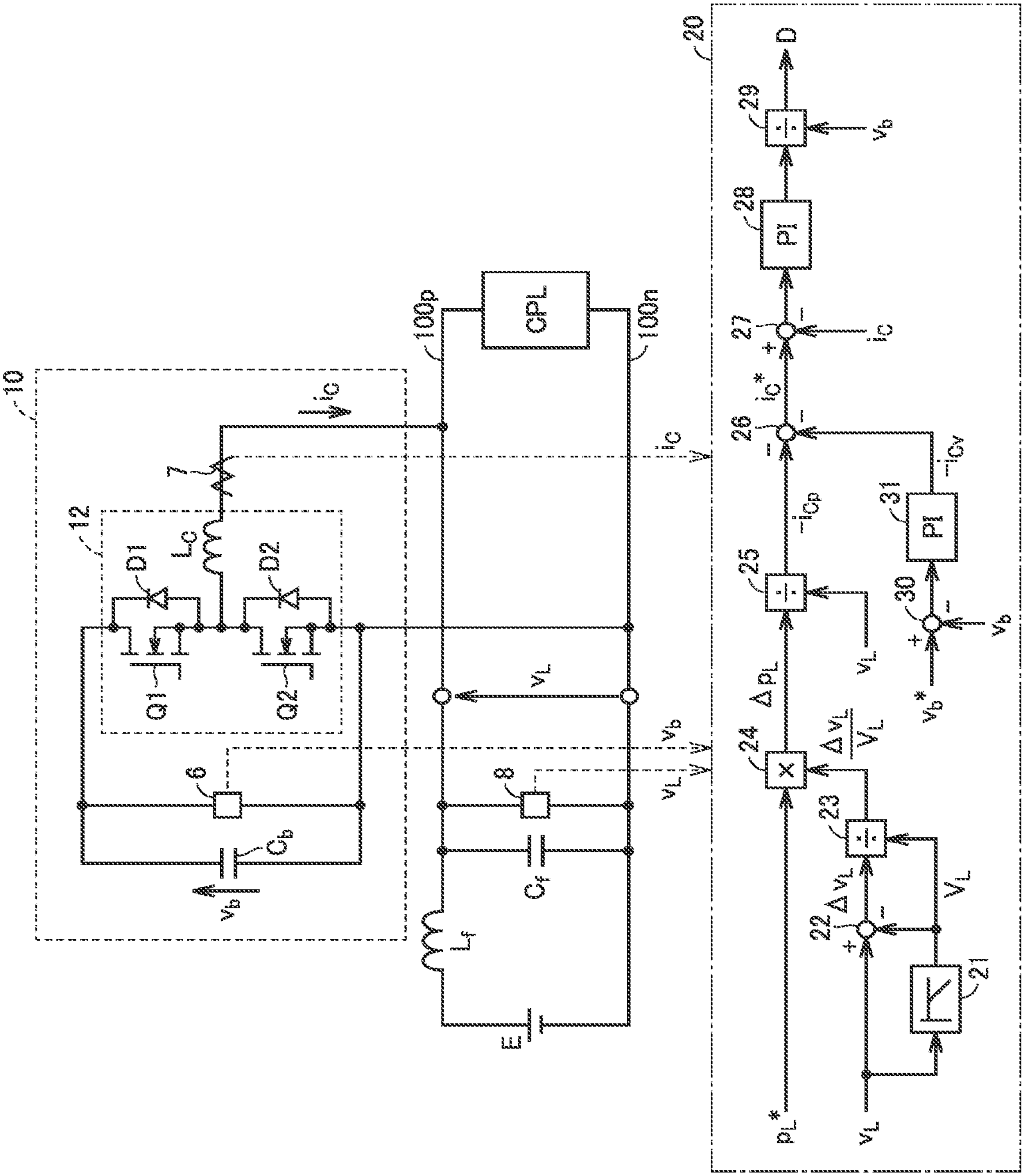
FIG. 5 is a block diagram illustrating a control configuration of the voltage stabilizer.

FIG. 5 is a block diagram illustrating a control configuration of voltage stabilizer 10. As illustrated in FIG. 5, the DC power distribution system further includes voltage detectors 6 and 8, a current detector 7, and a control circuit 20.

Voltage detector 6 detects an instantaneous value of inter-terminal voltage $v_b$ of buffer capacitor $C_b$, and gives a signal indicating a detected value thereof to control circuit 20. Voltage detector 8 detects an instantaneous value of input voltage $v_L$ of the CPL, and gives a signal indicating a detected value thereof to control circuit 20.

Current detector 7 detects compensating current $i_C$ flowing between an inductor $L_C$ of bidirectional DC/DC converter 12 and DC positive bus 100*p*, and gives a signal indicating a detected value thereof to control circuit 20.

Control circuit 20 controls bidirectional DC/DC converter 12 on the basis of signals from voltage detectors 6 and 8 and current detector 7. Although not illustrated, control circuit 20 is configured including a central processing unit (CPU), a memory, and an input/output circuit. A control block to be described later can be realized by the CPU executing a program stored in the memory. Alternatively, at least a part of control circuit 20 can be configured using a circuit such as a field programmable gate array (FPGA) or an application specific integrated circuit (ASIC). Furthermore, at least a part of control circuit 20 can be configured by an analog circuit.

Control circuit 20 controls compensating current $i_C$ by using bidirectional DC/DC converter 12, to realize exchange of electric power $\Delta p_L$ between voltage stabilizer 10 and DC bus 100. Specifically, control circuit 20 is configured including a low pass filter (LPF) 21, subtractors 22 and 27, dividers 23, 25, and 29, a multiplier 24, an adder 26, and PI controllers 28 and 31.

LPF 21, subtractor 22, divider 23, and multiplier 24 constitute an arithmetic circuit for arithmetic operation of electric power $\Delta p_L$ (hereinafter, also referred to as compensating electric power $\Delta p_L$) that should be compensated by voltage stabilizer 10. In this arithmetic circuit, as shown in Equation (7), input voltage $v_L$ is separated into a steady component $V_L$ and a fluctuation component $\Delta v_L$. Note that, steady component $V_L$ can be obtained by inputting input voltage $v_L$ to LPF 21. A cutoff frequency of LPF 21 is sufficiently lower than the resonance frequency of the LC filter.

[Formula 7]

$$v_L = V_L + \Delta v_L \tag{7}$$

Electric power $p_L$ actually supplied from DC bus 100 to the CPL and voltage stabilizer 10 can be expressed by the following Equation (8) by using Equation (7). $p_L$* is electric power supplied from DC bus 100 to the CPL, and is electric power required by the load.

[Formula 8]

$$p_L = \left(1 + \frac{\Delta v_L}{V_L}\right) p_L^* = p_L^* + \Delta p_L \tag{8}$$

From Equation (8), compensating electric power $\Delta p_L$ is given by the following Equation (9).

[Formula 9]

$$\Delta p_L = \frac{\Delta v_L}{V_L} p_L^* \tag{9}$$

When voltage stabilizer 10 exchanges compensating electric power $\Delta p_L$ with DC bus 100, a combination of the CPL and voltage stabilizer 10 can behave as a constant current load as a whole. As a result, even if the CPL absorbs any load, it is considered that the DC voltage control in the DC power distribution system is not affected at all.

In the arithmetic circuit illustrated in FIG. 5, fluctuation component $\Delta v_L$ is obtained by subtracting steady component $V_L$ from input voltage $v_L$ by subtractor 22. Then, compensating electric power $\Delta p_L$ of voltage stabilizer 10 is obtained by multiplying electric power $p_L$* by a ratio ($\Delta v_L/V_L$) of fluctuation component $\Delta v_L$ to steady component $V_L$, by divider 23 and multiplier 24.

By dividing compensating electric power $\Delta p_L$ by input voltage $v_L$ by divider 25, a compensating current $i_{C_p}$ is obtained as shown in the following Equation (10). Note that, in the present embodiment, compensating current $i_{C_p}$ is defined such that a direction in which electric power (current) flows from voltage stabilizer 10 to DC bus 100 is positive. Therefore, in Equation (10), $\Delta p_L/v_L$ is multiplied by −1.

[Formula 10]

$$i_{c_p} = -\frac{\Delta p_L}{v_L} \tag{10}$$

Accordingly, it is obvious that voltage stabilizer 10 is only required to inject compensating current $i_{C_p}$ into DC bus 100. Since an average value of compensating electric power $\Delta p_L$ is theoretically zero, inter-terminal voltage $v_b$ of buffer capacitor $C_b$ should not change steadily.

However, in practice, inter-terminal voltage $v_b$ of buffer capacitor $C_b$ fluctuates due to a power loss or the like generated in bidirectional DC/DC converter 12. Therefore, when voltage stabilizer 10 continues the current control according to compensating current $i_{C_p}$, there is a concern that the current control can no longer be executed due to an excessive increase in inter-terminal voltage $v_b$ or a decrease in inter-terminal voltage $v_b$ to input voltage $V_L$. Therefore, in parallel with the current control according to compensating electric power $\Delta p_L$, control (hereinafter, also referred to as buffer voltage control) for keeping inter-terminal voltage $v_b$ of buffer capacitor $C_b$ constant is required.

In control circuit 20 illustrated in FIG. 5, a subtractor 30 and PI controller 31 constitute a buffer voltage control system. Specifically, subtractor 30 subtracts inter-terminal voltage $v_b$ from a predetermined inter-terminal voltage command value $V_b$*. PI controller 31 performs proportional operation and integral operation on a deviation $\Delta v_b$ between inter-terminal voltage command value $V_b$* and inter-terminal voltage $v_b$ calculated by subtractor 30. Note that, instead of PI controller 31, a PID controller that further performs differential operation may be used, or a feedback arithmetic device having another configuration may be used. PI controller 31 outputs an arithmetic result as a compensating current iCy. Compensating current iCy corresponds to a compensating current for buffer voltage control.

Adder 26 generates a compensating current command value $i_C$* by adding a value obtained by multiplying compensating current $i_{C_v}$ by −1 to a value obtained by multiplying original compensating current $i_{C_p}$ by −1.

Subtractor 27 subtracts compensating current $i_C$ from compensating current command value $i_C$*. PI controller 28 performs proportional operation and integral operation on a deviation $\Delta i_C$ between compensating current command value $i_C$* and compensating current $i_C$ calculated by subtractor 27. Note that, instead of PI controller 28, a PID controller that further performs differential operation may be used, or a feedback arithmetic device having another configuration may be used. PI controller 28 outputs an arithmetic result as an input voltage command value $v_L$*, which is a command value for input voltage $v_L$.

Divider 29 obtains a duty ratio D of bidirectional DC/DC converter 12 by dividing input voltage command value $v_L$* by inter-terminal voltage $v_b$ of buffer capacitor $C_b$. Control circuit 20 controls ON/OFF of switching elements Q1 and Q2 in bidirectional DC/DC converter 12 in accordance with obtained duty ratio D.

As described above, control circuit 20 is configured including: a current control system that controls compensating current $i_C$ so as to exchange compensating electric power $\Delta p_L$ between voltage stabilizer 10 and DC bus 100; and the buffer voltage control system for keeping inter-terminal voltage $v_b$ of buffer capacitor $C_b$ constant. Since a transient characteristic is important in the current control system, it is necessary to design the current control system so that a sufficient transient response characteristic can be obtained. On the other hand, in the buffer voltage control system, it is sufficient that actual inter-terminal voltage vb of buffer capacitor $C_b$ becomes equal to inter-terminal voltage command value $V_b$* on average. Therefore, it is sufficient that a response frequency of the buffer voltage control system is set sufficiently low with respect to a fluctuation frequency of compensating electric power $\Delta p_L$. By doing in this way, interference between current control and buffer voltage control can be prevented.

(Experimental Verification)

Next, a result of verifying an operation of voltage stabilizer 10 in the DC power distribution system will be described.

<Experimental System>

Figure 6:
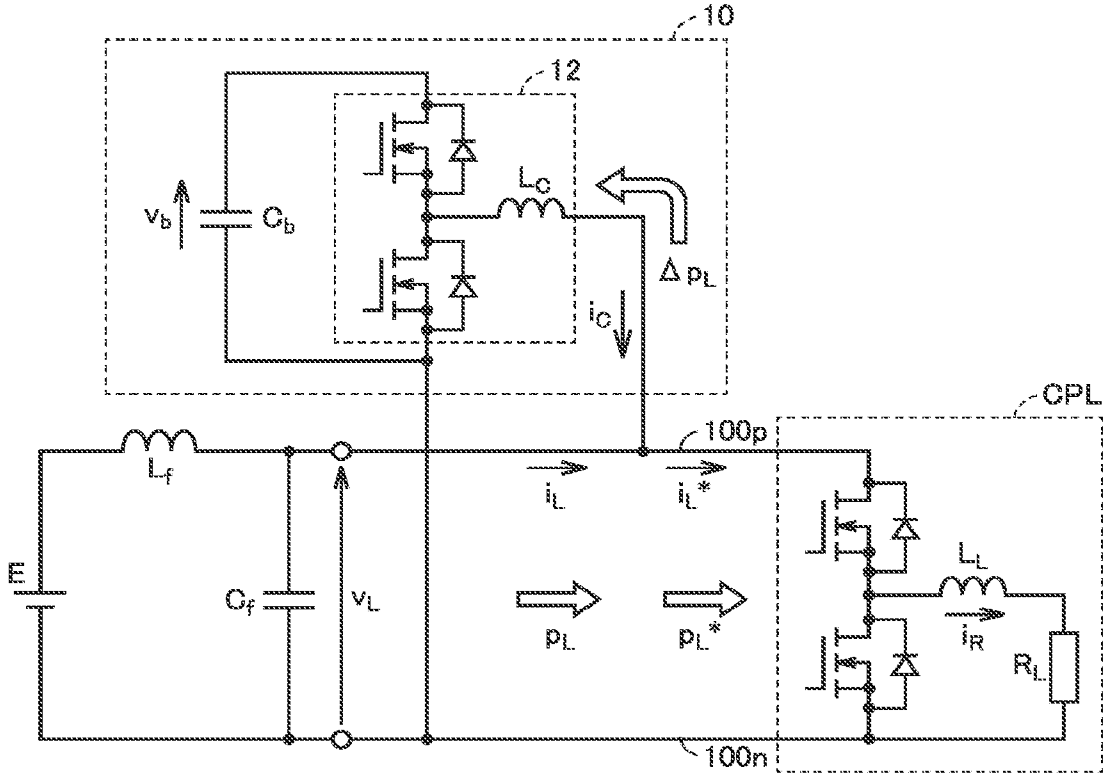
FIG. 6 is a diagram illustrating a main circuit configuration of an experimental system used for verification.

FIG. 6 is a diagram illustrating a main circuit configuration of an experimental system used for verification. FIG. 7 illustrates parameters of individual components of the experimental system illustrated in FIG. 6.

In the experimental system illustrated in FIG. 6, a step-down chopper circuit is used as the CPL. The step-down chopper circuit includes a half bridge circuit and a reactor $L_L$, and is configured to step down input voltage $v_L$ and supply input voltage $v_L$ to a load resistor $R_L$.

Voltage stabilizer 10 includes buffer capacitor $C_b$ and bidirectional DC/DC converter 12. In the experimental system, a half bridge circuit included in bidirectional DC/DC converter 12 and a half bridge circuit included in the step-down chopper circuit are the same, and both are implemented in a heat sink.

In the experimental system, since input voltage $v_L$ to the CPL, that is, an output voltage of the $L_C$ filter is not controlled, the experiment was performed under a condition that the voltage control becomes unstable even with relatively low electric power. In addition, a voltage E of the DC bus was set to 50 V in accordance with a resistance value of load resistor $R_L$ and rated electric power. Therefore, inter-terminal voltage command value $V_b$* of buffer capacitor $C_b$ was set to 100 V, which was twice voltage E of the DC bus, in consideration of voltage controllability.

A response frequency of current control of the step-down chopper circuit and current control of voltage stabilizer 10 is set higher than a resonance frequency (600 Hz) of the $L_C$ filter. The response frequency of voltage control of buffer capacitor $C_b$ is set to be lower than the resonance frequency of the $L_C$ filter.

In the experiment, for each of a case where voltage stabilizer 10 is not connected to the DC bus and a case where voltage stabilizer 10 is connected to the DC bus, temporal changes of input voltage $v_L$ to the CPL, input current $i_L$, and a current iR (hereinafter, also referred to as load current $i_R$) flowing through load resistor $R_L$ were measured when electric power $p_L$ was suddenly changed from 20 W to 40 W.

<Experimental Results>

Figure 8:
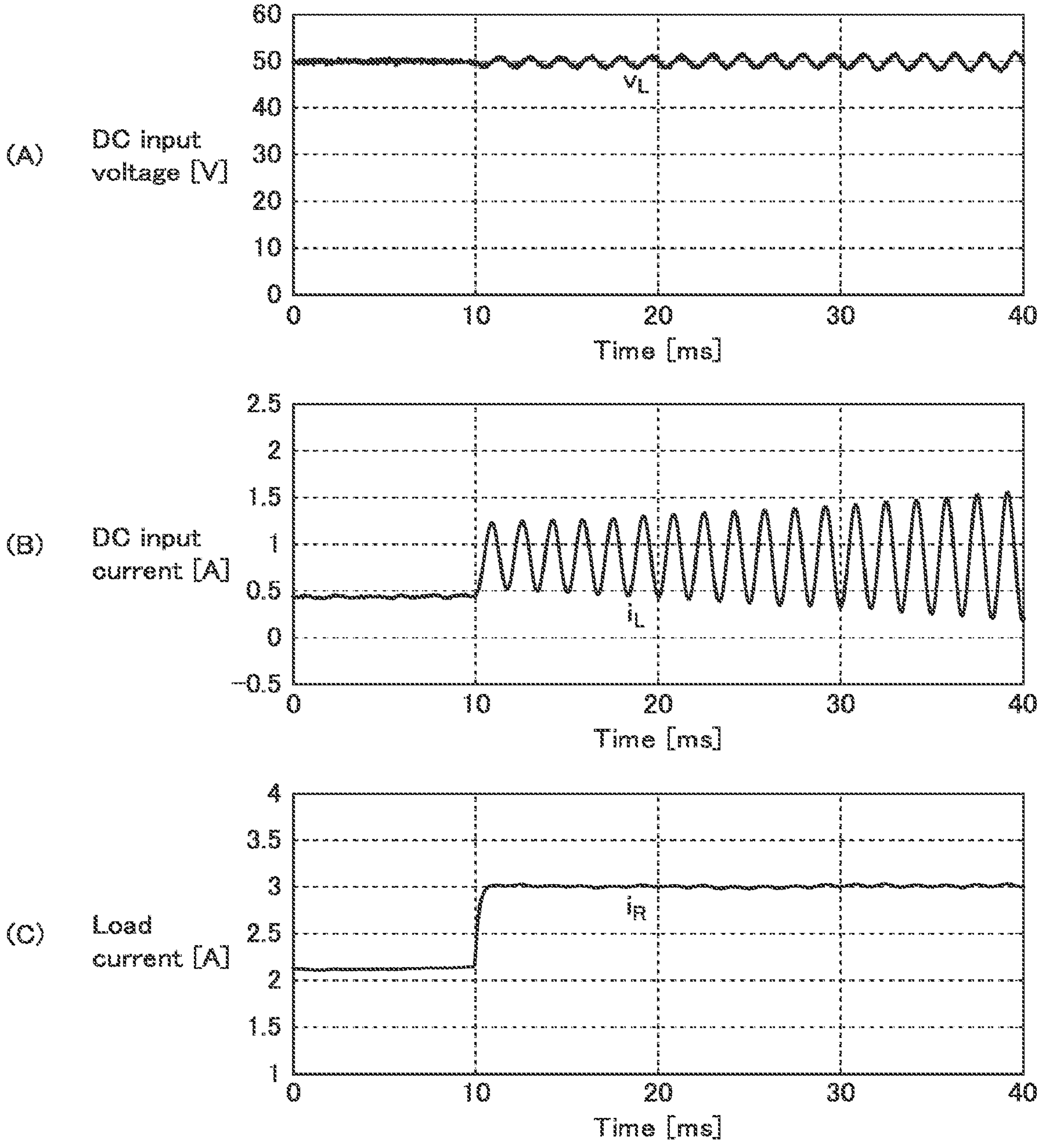
FIG. 8 is a graph illustrating an experimental result in a case where the voltage stabilizer is not connected to the DC bus.

FIG. 8 is a graph illustrating an experimental result in a case where voltage stabilizer 10 is not connected to the DC bus. FIG. 8(A) illustrates a waveform of input voltage $v_L$, FIG. 8(B) illustrates a waveform of input current $i_L$, and FIG. 8(C) illustrates a waveform of load current $i_R$.

When electric power $p_L$ suddenly changes from 20 W to 40 W at t=10 ms, vibration occurs in input voltage $v_L$ and input current $i_L$, and the vibration gradually increases with time. Note that, finally, a protection function against overcurrent was operated, and the experimental system was stopped. On the other hand, load current $i_R$ is maintained at a constant current by current control by the step-down chopper circuit. That is, the step-down chopper circuit continues to operate as a constant power load even when electric power $p_L$ changes.

It has been confirmed that the experimental system becomes unstable when electric power $p_L$ is greater than or equal to 40 W, in a case where voltage stabilizer 10 is not connected as described above.

Figure 9:
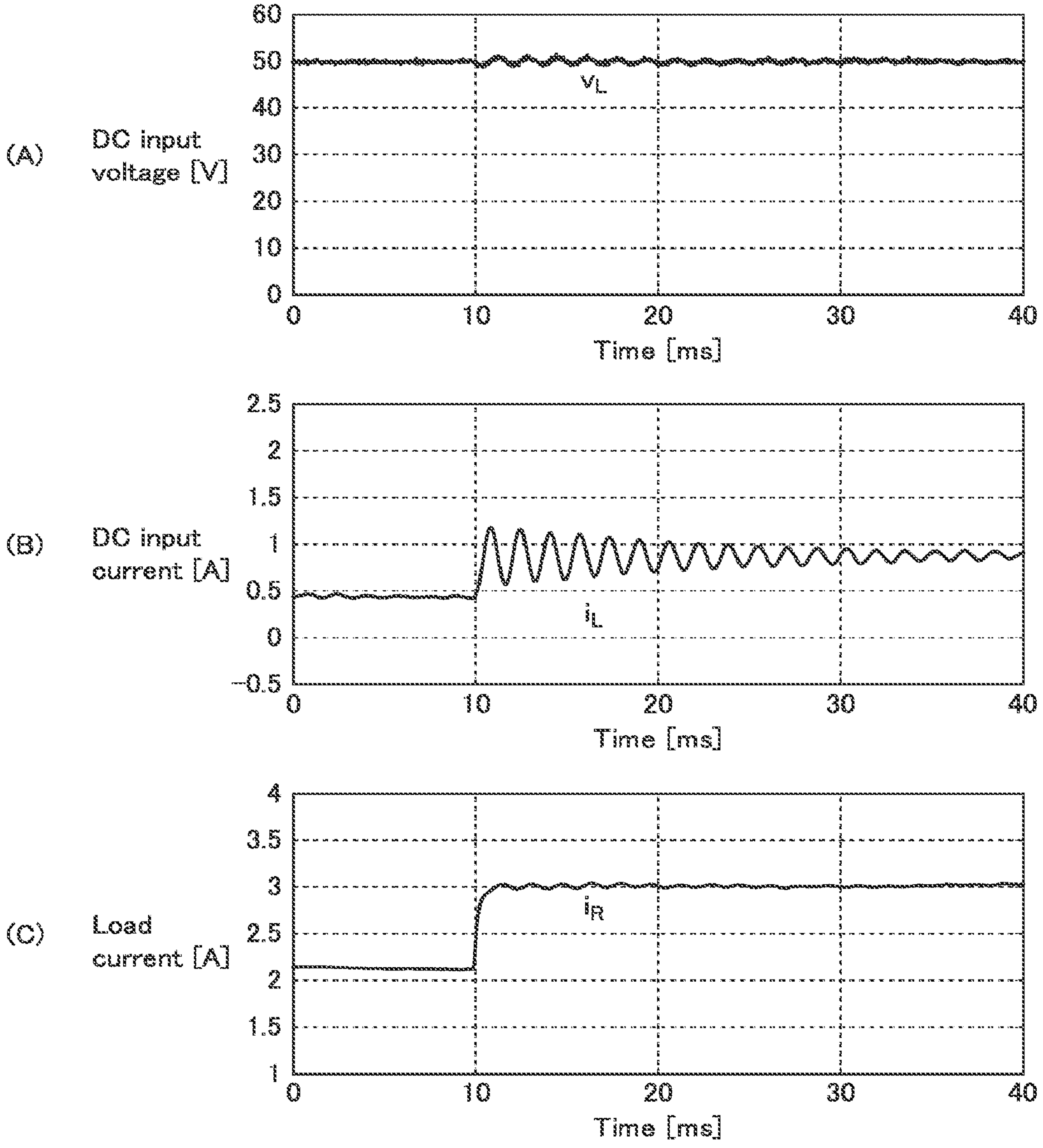
FIG. 9 is a graph illustrating an experimental result in a case where the voltage stabilizer is not connected to the DC bus and the control method described in NPL 1 is applied to a step-down chopper circuit.

FIG. 9 is a graph illustrating an experimental result in a case where voltage stabilizer 10 is not connected to the DC bus and the control method described in NPL 1 is applied to the step-down chopper circuit. The control method described in NPL 1 is to control the step-down chopper circuit so as to vary electric power $p_L$ in accordance with fluctuation of input voltage $v_L$, to cause the load to have a constant current.

FIG. 9(A) illustrates a waveform of input voltage $v_L$, FIG. 9(B) illustrates a waveform of input current $i_L$, and FIG. 9(C) illustrates a waveform of load current $i_R$. Also in FIG. 9, similarly to FIG. 8, electric power $p_L$ suddenly changes from 20 W to 40 W at t=10 ms.

Although vibration occurs in input voltage $v_L$ and input current $i_L$ in response to the sudden change in electric power $p_L$, the vibration is gradually attenuated with time, and the voltage is successfully stabilized. However, in this control method, since electric power $p_L$ is changed corresponding to fluctuation of input voltage $v_L$, rising of load current $i_R$ is delayed immediately after the sudden change in electric power $p_L$. Further, in load current $i_R$ after sudden change in electric power $p_L$, pulsation due to fluctuation of input voltage $v_L$ occurs. Therefore, it can be seen that the electric power required by the load cannot be completely supplied.

Figure 10:
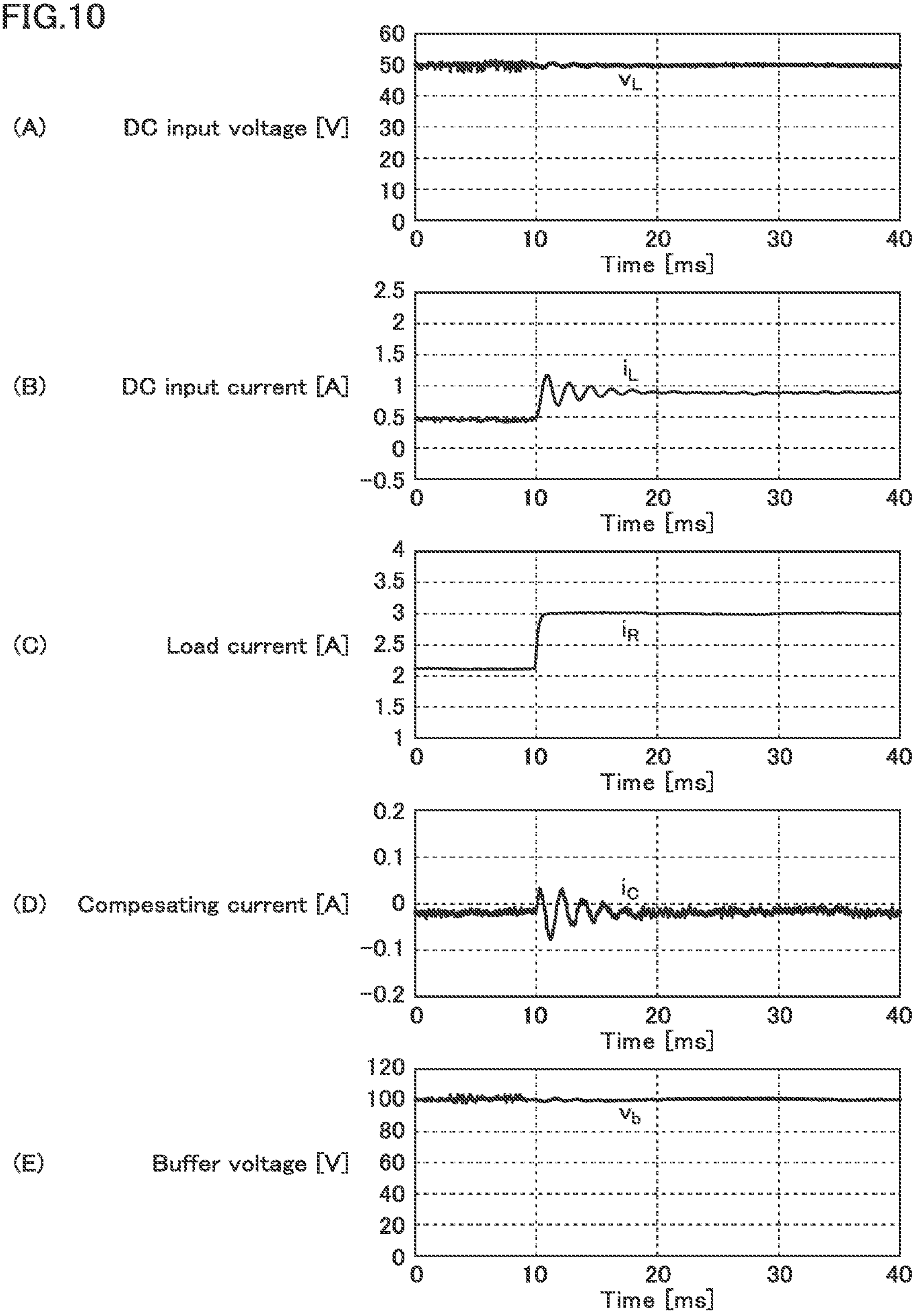
FIG. 10 is a graph illustrating an experimental result in a case where the voltage stabilizer is connected to the DC bus.

FIG. 10 is a graph illustrating an experimental result in a case where voltage stabilizer 10 is connected to the DC bus. FIG. 10(A) illustrates a waveform of input voltage $v_L$, FIG. 10(B) illustrates a waveform of input current $i_L$, and FIG. 10(C) illustrates a waveform of load current $i_R$. FIG. 10(D) illustrates a waveform of compensating current $i_C$, and FIG. 10(E) illustrates a waveform of inter-terminal voltage $v_b$ of buffer capacitor $C_b$. Also in FIG. 10, similarly to FIGS. 8 and 9, electric power $p_L$ suddenly changes from 20 W to 40 W at t=10 ms.

In response to the sudden change in electric power $p_L$, vibration occurs in input voltage $v_L$ and input current $i_L$. Voltage stabilizer 10 calculates compensating electric power $\Delta p_L$ on the basis of electric power $p_L$* and steady component $V_L$ and fluctuation component $\Delta v_L$ of input voltage $v_L$, and executes current control of bidirectional DC/DC converter 12 so as to exchange calculated compensating electric power $\Delta p_L$ with the DC bus. Therefore, vibration occurs in compensating current $i_C$ immediately after the sudden change in electric power $p_L$. The vibration in compensating current $i_C$ is gradually attenuated in accordance with stabilization of input voltage $v_L$. Note that compensating current $i_C$ is less than or equal to 1/10 of input current $i_L$.

Also in FIG. 10, similarly to FIG. 9, after the sudden change in electric power $p_L$, vibration of input voltage $v_L$ and input current $i_L$ is gradually attenuated, and the voltage is successfully stabilized. However, in FIG. 10, not only that the voltage is successfully stabilized, but also delay in rising of load current $i_R$ and pulsation of electric power $p_L$ seen in FIG. 9 can be suppressed. Therefore, it was confirmed that electric power originally required by the load was able to be supplied.

In addition, it can be seen that, although only buffer capacitor $C_b$ having a small capacitance is applied, the problem of the instability of input voltage $v_L$ can be solved only by occurrence of compensating current $i_C$ of less than or equal to 1/10 of input current $i_L$ and several % of pulsation of inter-terminal voltage $v_b$ for a short time.

Figure 11:
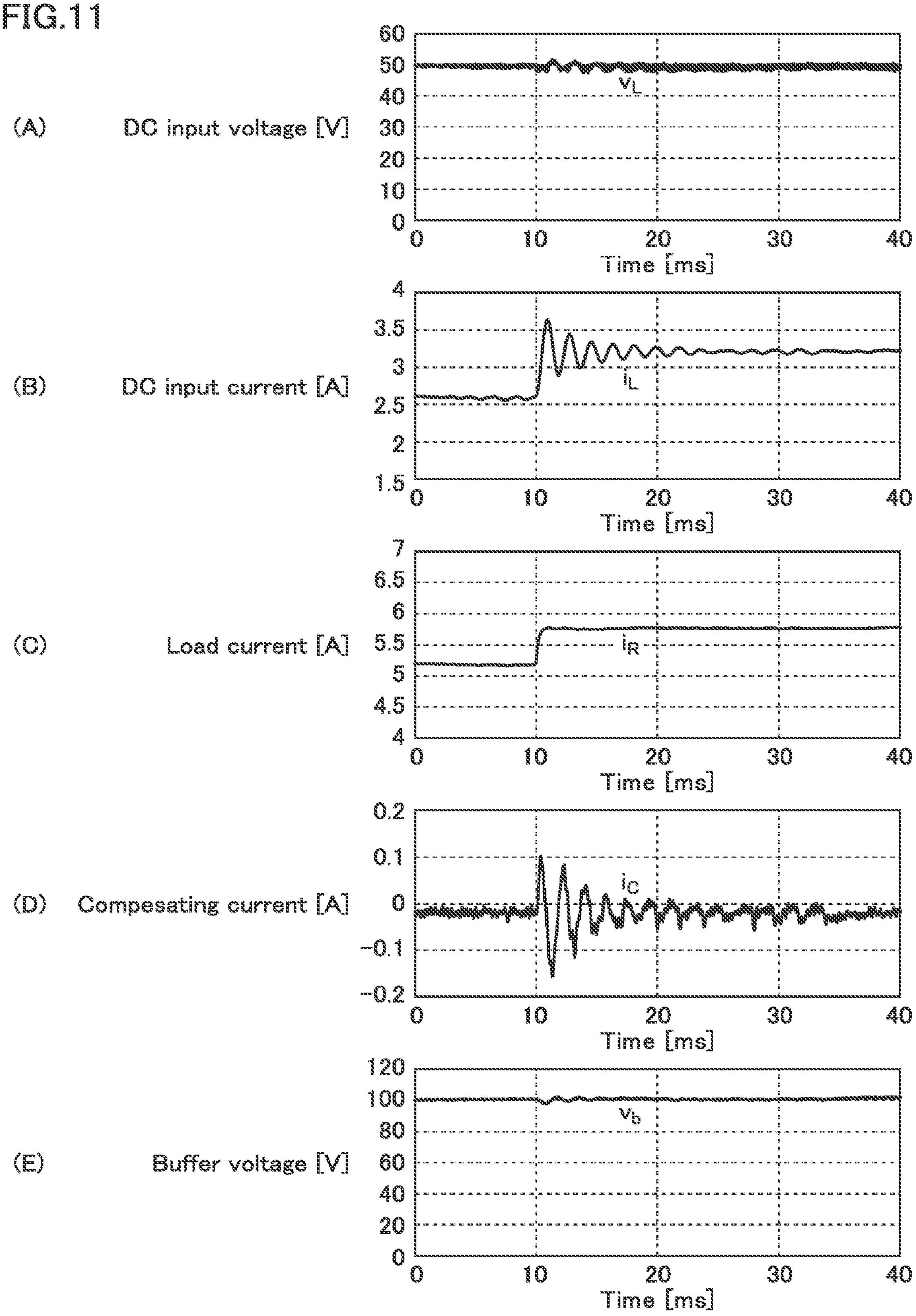
FIG. 11 is a graph illustrating an experimental result in a case where the voltage stabilizer is connected to the DC bus.

FIG. 11 is a graph illustrating an experimental result when electric power $p_L$ is further increased from 120 W to 150 W in a case where voltage stabilizer 10 is connected to the DC bus. FIG. 11(A) illustrates a waveform of input voltage $v_L$, FIG. 11(B) illustrates a waveform of input current $i_L$, and FIG. 11(C) illustrates a waveform of load current $i_R$. FIG. 11(D) illustrates a waveform of compensating current $i_C$, and FIG. 11(E) illustrates a waveform of inter-terminal voltage $v_b$ of buffer capacitor $C_b$.

In FIG. 11, electric power $p_L$ suddenly changes from 120 W to 150 W at t=10 ms. Theoretically, it is considered that destabilization of input voltage $v_L$ increases as electric power having a constant power load increases. However, as illustrated in FIG. 11, it can be seen that an attenuation characteristic of input voltage $v_L$ after the sudden change in electric power $p_L$ hardly changes from the case of FIG. 10. This is because voltage stabilizer 10 can operate such that the constant power load looks like a constant current load, and as a result, does not affect the voltage control of the DC bus.

However, as the electric power of the constant power load increases, a pulsation width of compensating current $i_C$ and inter-terminal voltage $v_b$ of buffer capacitor $C_b$ increases.

Action and Effect

As described above, in the DC power distribution system according to the present embodiment, voltage stabilizer 10 is connected to the DC bus in parallel with the constant power load (CPL), and voltage stabilizer 10 is caused to compensate for electric power $\Delta p_L$ which is a difference between electric power $p_L$* supplied to the constant power load and electric power $p_L$ for turning into a constant current load. As a result, voltage stabilizer 10 and the constant current load are operated as the constant current load as a whole.

According to the present embodiment, instability of the voltage control of the DC bus caused by the constant power load can be improved by electric power compensation by voltage stabilizer 10. In addition, as compared with the conventional technique described in NPL 1 in which the control of the constant power load is changed to make the constant power load to cause a constant current, it is possible to suppress deterioration of a transient characteristic when the electric power supplied to the constant power load changes.

Furthermore, since voltage stabilizer 10 and the constant power load can be operated as a constant current load as a whole, even if a load condition changes, controllability of the DC voltage in the DC power distribution system is not affected. Therefore, voltage stabilizer 10 according to the present embodiment can be expected to contribute to voltage stabilization of a DC power distribution system to which an unspecified number of loads are connected.

It is to be understood that the embodiment that has been disclosed herein is not restrictive, but is illustrative in all respects. The scope of the present disclosure is defined not by the description above but by the claims, and it is intended to include all modifications within the meaning and scope equivalent to the claims.

REFERENCE SIGNS LIST

6, 8: voltage detector, 7: current detector, 10: voltage stabilizer, 12: bidirectional DC/DC converter, 20: control circuit, 21: LPF
22, 27, 30: subtractor, 23, 25, 29: divider, 24: multiplier, 26: adder, 28, 31: PI controller, 100: DC bus, 100*p*: DC positive bus, 100*n*: DC negative bus, 102 to 112: power converter, 114: commercial system, 116: AC power supply, 118: DC power supply, 120: power storage device, 122: AC load, 124: DC load, CPL: constant power load, Q1, Q2: switching element, D1, D2: diode, Cb: buffer capacitor, Lc: reactor

The invention claimed is:

1. A direct current (DC) power distribution system comprising:
a DC bus that distributes DC power;
a first power converter that converts DC power from the DC bus into electric power required by a load, the first power converter being connected between the DC bus and the load; and
a voltage stabilizer connected to the DC bus in parallel with the first power converter, wherein
the voltage stabilizer supplies electric power to the DC bus, the electric power supplied from the voltage stabilizer corresponding to fluctuation of an input voltage input from the DC bus to the first power converter and corresponding to DC power supplied from the DC bus to the first power converter,
wherein
the voltage stabilizer:
varies DC power supplied from the DC bus to the first power converter and the voltage stabilizer, in accordance with fluctuation of the input voltage, and
operates to compensate for a deviation between a first DC power and a second DC power, the first DC power being supplied to the first power converter and the voltage stabilizer, the second DC power being supplied to the first power converter.

2. The DC power distribution system according to claim 1, wherein
the first power converter operates as a constant power load, and
the first power converter and the voltage stabilizer integrally operate as a constant current load.

3. The DC power distribution system according to claim 1, wherein
the voltage stabilizer includes:
a buffer capacitor;
a bidirectional DC/DC converter connected between the DC bus and the buffer capacitor; and
a control circuit that controls the bidirectional DC/DC converter, and
the control circuit controls the bidirectional DC/DC converter such that the voltage stabilizer compensates for the deviation.

4. The DC power distribution system according to claim 3, wherein the bidirectional DC/DC converter includes a bidirectional chopper circuit.

5. The DC power distribution system according to claim 3, wherein
the first power converter operates as a constant power load, and
the first power converter and the voltage stabilizer integrally operate as a constant current load.

6. The DC power distribution system according to claim 3, wherein
the control circuit
separates the input voltage into a steady component and a fluctuation component,
calculates compensating electric power that should be compensated by the voltage stabilizer, by multiplying DC power supplied to the first power converter by a ratio of the fluctuation component to the steady component, and
controls the bidirectional DC/DC converter to exchange the calculated compensating electric power with the DC bus.

7. The DC power distribution system according to claim 6, wherein
the first power converter operates as a constant power load, and
the first power converter and the voltage stabilizer integrally operate as a constant current load.

8. The DC power distribution system according to claim 6, further comprising:
a second power converter that converts electric power from a power supply into DC power having a predetermined voltage and outputs the DC power to the DC bus; and
an LC filter connected between the second power converter and the first power converter, wherein
the control circuit includes a low pass filter (LPF) to receive the input voltage and output the steady component, and
a cutoff frequency of the LPF is lower than a resonance frequency of the LC filter.

9. The DC power distribution system according to claim 8, wherein
the first power converter operates as a constant power load, and
the first power converter and the voltage stabilizer integrally operate as a constant current load.

10. The DC power distribution system according to claim 6, wherein the control circuit exchanges the compensating electric power with the DC bus, and controls the bidirectional DC/DC converter to keep an inter-terminal voltage of the buffer capacitor constant.

11. The DC power distribution system according to claim 10, wherein
the first power converter operates as a constant power load, and
the first power converter and the voltage stabilizer integrally operate as a constant current load.

12. The DC power distribution system according to claim 10, wherein
the control circuit
generates a first compensating current command value that is a command value for a compensating current output from the bidirectional DC/DC converter, by dividing the compensating electric power by the input voltage,
generates a second compensating current command value in accordance with control operation using, as an input, a deviation of the inter-terminal voltage of the buffer capacitor with respect to a predetermined voltage command value,
generates a compensating current command value in accordance with a sum of the first compensating current command value and the second compensating current command value, and
executes current control of the bidirectional DC/DC converter to output the compensating current according to the compensating current command value.

13. The DC power distribution system according to claim 12, wherein
the first power converter operates as a constant power load, and
the first power converter and the voltage stabilizer integrally operate as a constant current load.

14. The DC power distribution system according to claim 12, wherein a response frequency of voltage control of the buffer capacitor is lower than a response frequency of the current control of the bidirectional DC/DC converter.

15. The DC power distribution system according to claim 14, wherein
the first power converter operates as a constant power load, and
the first power converter and the voltage stabilizer integrally operate as a constant current load.

16. A voltage stabilizer of a DC power distribution system, wherein
the DC power distribution system includes:
a DC bus; and
a first power converter that converts DC power from the DC bus into electric power required by a load, the first power converter being connected between the DC bus and the load, and
the voltage stabilizer supplies electric power to the DC bus, the electric power supplied by the voltage stabilizer corresponding to fluctuation of an input voltage input from the DC bus to the first power converter and corresponding to DC power supplied from the DC bus to the first power converter,
wherein
the voltage stabilizer:
varies DC power supplied from the DC bus to the first power converter and the voltage stabilizer, in accordance with fluctuation of the input voltage, and
operates to compensate for a deviation between a first DC power and a second DC power, the first DC power being supplied to the first power converter and the voltage stabilizer, the second DC power being supplied to the first power converter.

17. The voltage stabilizer according to claim 16, comprising:
a buffer capacitor;
a bidirectional DC/DC converter connected between the DC bus and the buffer capacitor; and
a control circuit that controls the bidirectional DC/DC converter, wherein
the control circuit controls the bidirectional DC/DC converter such that the voltage stabilizer compensates for the deviation.

* * * * *